United States Patent [19]

Taylor

[11] 3,916,557
[45] Nov. 4, 1975

[54] BAIT SOUNDER
[76] Inventor: Van L. Taylor, 932 Mountain Drive, Fultondale, Ala. 35068
[22] Filed: Jan. 2, 1975
[21] Appl. No.: 537,933

[52] U.S. Cl. ............................... 43/43.12; 43/44.95
[51] Int. Cl.² ......................................... A01K 95/00
[58] Field of Search ............... 43/44.92, 44.95, 41.2, 43/43.12, 44.88, 44.93, 43.1, 43.11

[56] References Cited
UNITED STATES PATENTS
1,259,664   3/1918   Peters ................................. 43/44.95
2,904,923   9/1959   Conyers ............................. 43/43.11
3,081,575   3/1963   Meisner ............................. 43/43.12
3,648,399   3/1972   Lloyd ................................. 43/43.12

Primary Examiner—Warner H. Camp

[57] ABSTRACT

A sounder for lowering bait attached to a fishing line in water embodying a heavy body of a weight to sink in water and having a first clamp which cooperates with a second clamp on a movable member connected to the body. The clamps are urged toward each other for clamping a fishing line therebetween. A control line connected to the movable member moves the second clamp away from the first clamp after the body, bait and fishing line sink in the water.

8 Claims, 3 Drawing Figures

U.S. Patent    Nov. 4, 1975    3,916,557
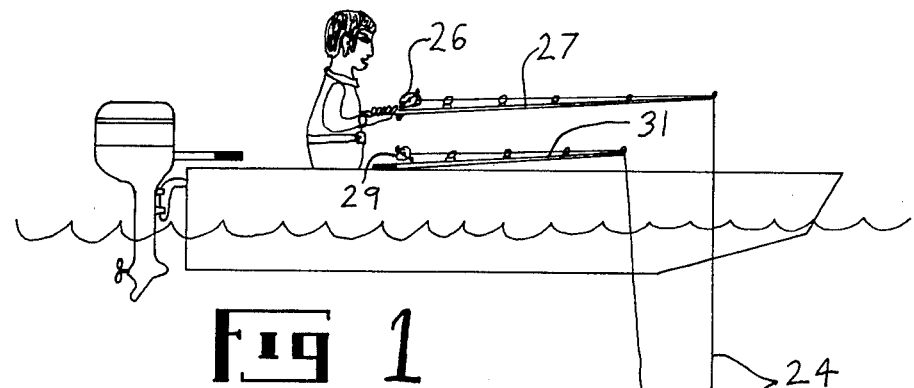
Fig 1
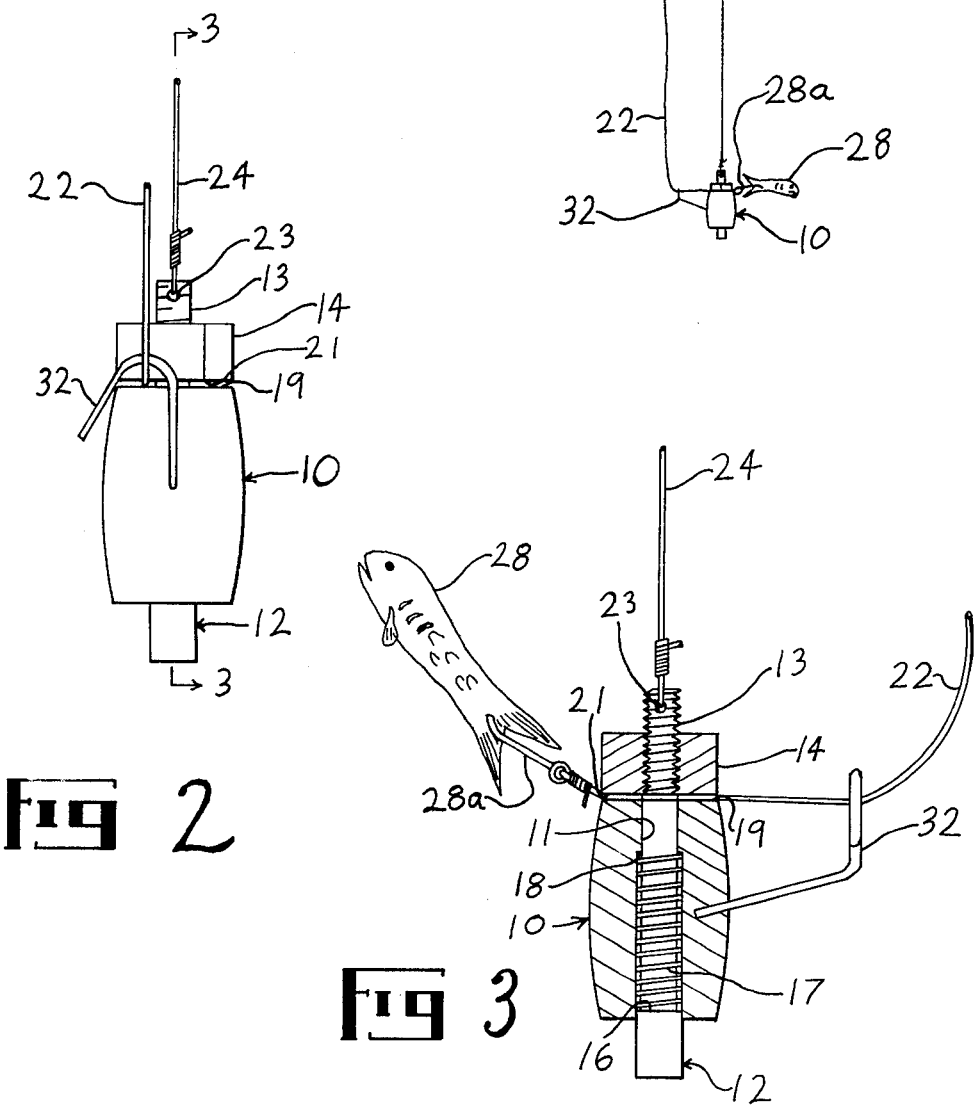
Fig 2
Fig 3

BAIT SOUNDER

BACKGROUND OF THE INVENTION

This invention relates to a bait sounder and more particularly to a device for lowering bait attached to a line in water for catching fish and the like.

Heretofore in the art to which my invention relates, difficulties have been encountered in lowering bait, such as live bait, toward the bottom of a body of water whereby the bait is then free to move adjacent the bottom of the body of water or at selected elevations above the bottom. That is, it has been the usual practice to lower bait in a body of water by applying a weight to the line adjacent the bait whereby the bait merely falls to the bottom of the body of water and then remains in the vicinity of the fixed location of the weight. Accordingly, where live bait is employed, the range of travel of the bait is limited. Also, the elevation at which the bait moves in the body of water is limited.

BRIEF SUMMARY OF THE INVENTION

In accordance with my invention, I provide a bait sounder for lowering bait into a body of water with the sounder being detachably connected to the fishing line whereby the fishing line and bait is released after being lowered to the desired elevation in the body of water. The sounder comprises a body of a weight to sink in the water and has a clamp element which cooperates with a second clamp element on a movable member which in turn is connected to the body. The clamps are urged toward each other for releasably clamping a fishing line therebetween. A control line is connected to the movable member and moves the second clamp away from the first clamp upon actuation of the control line after the body, bait and fishing line sink to the desired level in the water.

DESCRIPTION OF THE DRAWING

A bait sounder embodying features of my invention is illustrated in the accompanying drawing, forming a part of this application, in which:

FIG. 1 is a side elevational view showing my improved bait sounder in use;

FIG. 2 is an enlarged, side elevational view as viewed from the left side of the bait sounder shown in FIG. 1; and, FIG. 3 is a vertical sectional view through the bait sounder taken generally along the line 3—3 of FIG. 2.

Referring now to the drawing for a better understanding of my invention, my bait sounder comprises a heavy body 10 which is of a weight to sink in a body of water. The body 10 is provided with a centrally disposed opening 11 therethrough for receiving an elongated member 12 with a sliding fit. The upper end of the elongated member 12 is threaded as at 13 for receiving a retaining nut 14. As shown in FIG. 3, the lower end of the elongated member 12 is enlarged in diameter to provide a shoulder 16 which serves as a spring abutment for a compression spring 17 which surrounds the elongated member 12. The upper end of the spring engages an annular shoulder 18 provided in the opening 11 whereby the compression spring 17 urges the elongated member 12 and the nut 14 carried thereby in a downward direction toward the body 10. The upper surface of the body 10 and the lower surface of the nut 14 define clamp elements 19 and 21, respectively, which are adapted to engage a fishing line 22 therebetween, as shown in FIGS. 2 and 3. Accordingly, the elongated member 12 and its adjustable nut 14 define a movable member which is adapted to move relative to the body 10.

An opening 23 is provided in the upper end of the elongated member 12 for receiving the lower end of a control line 24 which is carried by a reel 26 on a rod 27. The control line 24 is employed to lower the entire unit, including the heavy body 10, the elongated member 12, the fishing line 22 and the bait, indicated at 28, into the water. The fishing line 22 is carried by a reel 29 on a rod 31 which is operated in the usual manner after the fishing line 22 has been released from the clamp elements 19 and 21.

Secured to the body 10 is a laterally extending guide member 32 which is adapted to extend over and engage the fishing line 22 outwardly of the body 10 to restrain rotation of the body 10 as it is supported in the body of water. As shown in FIG. 2, the portion of the guide member 32 which engages the fishing line 22 is of a generally inverted U-shape to facilitate separation of the fishing line therefrom upon movement of the clamp elements 19 and 21 away from each other.

From the foregoing description, the operation of my improved bait sounder will be readily understood. The control line 24 is secured to the upper end of the elongated member 12 whereby the entire bait sounder unit may be lowered into the water. Before lowering the bait sounder unit into the water, the bait 28, such as a live minnow, is placed on the hook 28$^a$ carried by the fishing line 22. The fisherman then pushes upwardly on the lower end of the elongated member 12 whereby the clamp element 21 carried by the movable member 14 moves upwardly away from the clamp element 19 carried by the body 10. The fishing line 22 is then inserted between the clamp elements 19 and 21. Upon release of the elongated member 12, the spring 17 urges the clamp element 21 toward the clamp element 19 to thus clamp the fishing line 22 therebetween. By rotating the member 14 relative to the elongated member 12, the member 14 may be positioned at selected axial positions to thus vary the tension applied by the spring member 17. The line 22 passes beneath the inverted U-shaped portion of the guide member 32 to prevent the body 10 from spinning as it is lowered into the body of water.

When it is desired to release the fishing line 22 from the bait sounder, the fisherman gives a quick upward jerk on the control line 24 to thus move the movable member 14 carrying the clamp element 21 away from the body 10 and its clamp element 19. The inertia of the heavy body 10 causes it to stand still momentarily while the elongated member 12 and its nut 14 move upwardly, thus permitting the line 22 to become disengaged from the clamp elements 19 and 21. The bait, such as a minnow, is thus delivered to deep water and is released therein without any weight remaining on the line, this being important due to the fact that when fish strike they often turn loose if there is any resistance at all on the fishing line. The fishing line 22 may be released at any desired depth in the body of water by merely giving a quick upward jerk on the line 24, as described above.

From the foregoing, it will be seen that I have devised an improved bait sounder which is adapted to carry a fishing line to any desired depth in a body of water and then release the fishing line and the bait carried thereby. By releasing the fishing line and its bait at any desired depth without the use of a weight which remains attached to the fishing line, the bait, such as a live minnow, is free to move in the surrounding area, thus simulating the movement of an unfettered minnow.

Also, by providing an adjustable movable member 14 which is adapted to move to selected axial positions relative to the elongated member 12, the tension applied by the clamping elements 19 and 21 may be varied to thus vary the amount of upward pull which is required to release the clamp elements 19 and 21. Furthermore, by providing the laterally extending guide member 32 which engages the fishing line laterally of the body 10, a tendency of the body 10 to spin in the water is greatly reduced.

While I have shown my invention in but one form, it will be obvious to those skilled in the art that it is not so limited, but is susceptible of various other changes and modifications without departing from the spirit thereof.

What I claim is:

1. In a bait sounder for lowering bait attached to a fishing line in water,
   a. a heavy body of a weight to sink in water and having a first clamp element disposed to engage said fishing line,
   b. a movable member operatively connected to said body and having a second clamp element disposed to cooperate with said first clamp element to releasably clamp said fishing line therebetween,
   c. means urging said movable member and said second clamp element toward said first clamp element, and
   d. a control line connected to said movable member for moving said second clamp element away from said first clamp element to release said fishing line after the fishing line and said body sink in said water.

2. A bait sounder as defined in claim 1 in which said means urging said movable member and said second clamp element toward said first clamp element comprises a spring member interposed between said movable member and said body.

3. A bait sounder as defined in claim 1 in which said movable member comprises:
   a. an elongated member operatively connected to said body and mounted for movement relative to said first clamp element carried by said body,
   b. a laterally extending member connected to said elongated member and carrying said second clamp element, and
   c. a spring member mounted between said elongated member and said body urging the clamp elements toward each other.

4. A bait sounder as defined in claim 3 in which an opening is provided in said body for receiving said elongated member with a sliding fit and said spring member surrounds said elongated member between spring abutments carried by said elongated member and said body.

5. A bait sounder as defined in claim 4 in which the lowermost end of said elongated member projects from the lowermost end of said body for moving said elongated member and the laterally extending member carried thereby in an upward direction.

6. A bait sounder as defined in claim 3 in which said laterally extending member is mounted for adjustment on said elongated member to vary the tension applied by said spring member.

7. A bait sounder as defined in claim 1 in which a laterally extending guide member is carried by said body in position to engage the fishing line outwardly of said body to restrain rotation of said body.

8. A bait sounder as defined in claim 7 in which the portion of said guide member which engages said fishing line is of a generally inverted U-shape to facilitate separation of said fishing line therefrom upon movement of the clamp elements away from each other.

* * * * *